US006728772B1

(12) United States Patent
Driever et al.

(10) Patent No.: US 6,728,772 B1
(45) Date of Patent: Apr. 27, 2004

(54) AUTOMATIC CONFIGURATION OF A CHANNEL-TO-CHANNEL CONNECTION EMPLOYING CHANNEL-TO-CHANNEL FUNCTIONING INTEGRATED WITHIN ONE OR MORE CHANNELS OF A COMPUTING ENVIRONMENT

(75) Inventors: Patricia G. Driever, Poughkeepsie, NY (US); John R. Flanagan, Poughkeepsie, NY (US); Robert P. Jewett, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/569,755

(22) Filed: May 12, 2000

(51) Int. Cl.[7] .......................... G06F 15/16; H04L 12/28
(52) U.S. Cl. ....................... 709/228; 709/249; 709/250; 370/431; 370/464
(58) Field of Search ................... 709/228, 250, 709/227, 249; 370/357–359, 419, 464, 431

(56) References Cited

U.S. PATENT DOCUMENTS

| | | | | | |
|---|---|---|---|---|---|
| 4,941,089 | A | * | 7/1990 | Fischer ...................... 709/231 |
| 5,289,579 | A | * | 2/1994 | Punj ........................... 709/227 |
| 5,329,634 | A | * | 7/1994 | Thompson ...................... 710/8 |
| 5,513,368 | A | * | 4/1996 | Garcia et al. .................. 710/22 |
| 5,742,607 | A | * | 4/1998 | Beighe et al. ................ 370/419 |
| 5,867,648 | A | * | 2/1999 | Foth et al. .................... 709/230 |
| 5,943,481 | A | * | 8/1999 | Wakeland ..................... 709/230 |
| 6,038,235 | A | * | 3/2000 | Ho et al. ...................... 370/462 |
| 6,115,376 | A | * | 9/2000 | Sherer et al. ................. 370/389 |
| 6,115,747 | A | * | 9/2000 | Billings et al. .............. 709/231 |
| 6,202,153 | B1 | * | 3/2001 | Diamant et al. .............. 713/200 |
| 6,233,619 | B1 | * | 5/2001 | Narisi et al. ................. 709/230 |
| 6,282,238 | B1 | * | 8/2001 | Landry ......................... 375/222 |
| 6,289,388 | B1 | * | 9/2001 | Disney et al. ................ 709/238 |
| 6,320,863 | B1 | * | 11/2001 | Ramfelt ........................ 370/404 |
| 6,400,730 | B1 | * | 6/2002 | Latif et al. ................... 370/466 |
| 6,530,078 | B1 | * | 3/2003 | Shmid et al. ................. 717/138 |
| 2001/0030943 | A1 | * | 10/2001 | Gregg et al. ................. 370/231 |

OTHER PUBLICATIONS

IBM S/390 FICON Implementation Guide, Dec. 1999, IBM, p. 1.*
IBM, TDB–ACC–NO: NN9110129, Channel to channel computer communications without a seperate adapter, Oct. 1991, IBM, pp. 1–2.*
IBM, TDB–ACC–NO: NN9009460, Status–pending indicator for multiple, virtual, concorrent active channel I/O devices, Oct. 1990, IBM, pp. 1–2.*
IBM, TDB–ACC–NO: NN7608847, Channel to channel adapter for linking two data processors, Aug. 1976, IBM, pp. 1–3.*
IBM,TDB–ACC–NO: NN79023618, System for queuing of multiple synced–for–read requests, Feb. 1979, IBM, pp. 1–2.*

(List continued on next page.)

Primary Examiner—Krisna Lim
(74) Attorney, Agent, or Firm—Floyd A. Gonzalez, Esq.; Kevin P. Radigan, Esq.; Heslin Rothenberg Farley & Mesiti P.C.

(57) ABSTRACT

Channel-to-channel communications is provided by integrating channel-to-channel functionality into one or more communication channels of a computing environment which may include heterogenous computer systems. The one or more channels having the integrated CTC function are non-dedicated channels also capable of conventional channel functionality. Work units at such channels are forwarded to either the CTC function or the channel function based on work unit type. Further, a facility is provided for. automatically deciding which of the first channel and the second channel is to provide the CTC function for a CTC connection. Partition-to-partition communication can also be accomplished using the integrated CTC function by establishing an internal logical path between a first logical partition and the CTC function and a second logical path between a second logical partition and the CTC function.

27 Claims, 5 Drawing Sheets

OTHER PUBLICATIONS

IBM,TDB–ACC–NO: NN80881134, Monitoring of device usage, Aug. 1980, IBM, pp. 1–2.*

IBM,TDB–ACC–NO: NN81113004, Dynamically assignable processor to processor communication links, Nov. 1981, IBM, pp. 1–3.*

Wilson, IBM enhances telecom products, Feb. 1988, Intertec publishing corporation, v214, pp. 1–2.*

DeCusatis et al., Fiber optic interconnects for the IBM S/390 Parallel enterprise server G5, 1999, IBM, pp. 1–23.*

IBM, FICON connectivity, p. 1.*

Fiuczynski et al., On using intelligent network interface cards to support multimedia applications, pp. 1–3.*

Moyer, Disconnection method for a channel–to–channel adapter, Aug. 1981, IBM, vol. 24, No. 3, p. 1.*

IBM Corporation, "Enterprise Systems Architecture/390— ESCON Channel–to–Channel Adapter", SA22–7203–00, (Oct. 1990), pp. 1–vii;1–22; A1–A3; B1;G1;X1–X2.

* cited by examiner

AUTOMATIC CONFIGURATION OF A CHANNEL-TO-CHANNEL CONNECTION EMPLOYING CHANNEL-TO-CHANNEL FUNCTIONING INTEGRATED WITHIN ONE OR MORE CHANNELS OF A COMPUTING ENVIRONMENT

CROSS-REFERENCED TO RELATED APPLICATIONS

This application contains subject matter which is related to the subject matter of the following applications, each of which is assigned to the same assignee as this application and filed on the same day as this application. Each of the below listed applications is hereby incorporated herein by reference in its entirety:

"Integration Of Channel-To-Channel Communication Capability Into A Communication Channel Of A Computing Environment," Driever et al., Ser. No. 09/570,290; and "Partition-To-Partition Communication Employing A Single Channel Path With Integrated Channel-To-Channel Function," Driever et al., Ser. No. 09/569,567.

TECHNICAL FIELD

This invention relates in general to channel subsystems, and more particularly, to the integration of channel-to-channel functioning into one or more communication channels of a computing environment.

BACKGROUND OF THE INVENTION

Channel-to-channel adapters have been used for many years as a general purpose communication mechanism between computer systems. For example, channel-to-channel adapters have been the principal mechanism for connecting an S/390 system (offered by International Business Machines Corporation) to other heterogenous environments, such as IBM's RS/6000 and/or AS/400 systems. The channel-to-channel adapter is protocol independent, and has wide application in areas such as coupling of multiprocessor systems as well as in traditional communications protocol stacks (e.g., TCP/IP, SNA). Conventionally, the CTC function is implemented on a stand-alone piece of hardware.

For parallel channel interfaces, the CTC function is implemented in a separate box outside of, e.g., a Central Electronic Complex (CEC) (offered by International Business Machines Corporation). In IBM Enterprise System Connection Architecture (ESCON), the CTC function is refined so that any particular ESCON channel can be configured as a dedicated channel or a dedicated CTC, through different loads of microcode. For example, reference an IBM publication entitled "Enterprise Systems Architecture/390 ESCON Channel-To-Channel Adapter," Publication No. SA22-7203-00 (1996). In all cases, the "entity" which provides the CTC function is dedicated to that purpose alone. Unfortunately, significant customer effort and expense is required for CTC configuration using such a dedicated CTC channel approach. Further, if a customer desires CTC communication between two logical partitions (LPARs), at least two channel path IDs (CHPIDs) are required.

In view of the above, a need continues to exist for an enhanced approach to providing CTC functionality within a computing environment to better facilitate communication between computer systems.

DISCLOSURE OF THE INVENTION

To briefly summarize, the present invention comprises in one aspect a method for providing communication between channels of at least one computing environment. The method includes: providing a channel-to-channel (CTC) function integrated within at least one of a first channel and a second channel between which a CTC connection is to be formed; and automatically deciding which of the first channel and the second channel is to provide the CTC function for the CTC connection.

Systems and computer program products corresponding to the above-summarized method are also described and claimed herein.

To restate, provided herein is a technique for implementing channel-to-channel communications within a computing environment that vastly increases a customer's connectivity options. This is achieved by integrating a channel-to-channel (CTC) function within one or more channels of a computing environment, with each channel also comprising a channel function. Operationally, a work unit is transferred to the CTC function or the channel function based on work unit type, i.e., whether the work unit itself originated with a channel function or a control unit. With the technique of the present invention, any two systems that have at least one channel connected to the network may have CTC connections set up between them with no additional cost. Many of the largest computer users are literally running out of available channel paths, so providing a dedicated CTC function is typically expensive both in terms of consuming scarce channel path ids as well as hardware costs. This is compounded by the fact that typically a customer will require a pair of CTCs for redundancy. However, with the present invention, the customer no longer has to dedicate channel path (CHPID) resources to the CTC function.

Further, the auto-configure feature described herein makes the customer configuration definition for the CTC connection trivial. The customer simply specifies a CTC control unit at at least one end of the connection, and auto-configuration automatically performs load balancing "under the covers". In addition, an ability to configure logical partition (LPAR)-to-LPAR communication through a single CHPID is provided, which further improves the connectivity options, particularly in low end systems, where the number of available channels may be limited. Although contemplated for Fiber Connection (FICON) channels (FICON channels being offered by International Business Machines Corporation), the concepts presented herein could equally apply to other types of system communication channels.

Additional features and advantages are realized through the techniques of the present invention. Other embodiments and aspects of the invention are described in detail herein and are considered part of the claimed invention.

BRIEF DESCRIPTION OF THE DRAWINGS

The above-described objects, advantages and features of the present invention, as well as others, will be more readily understood from the following detailed description of certain preferred embodiments of the invention, when considered in conjunction with the accompanying drawings in which.

BEST MODE FOR CARRYING OUT THE INVENTION

This invention relates generally to implementing channel-to-channel communications within a computing environment so as to vastly increase a customer's connectivity options. The computing environment may be based, for instance, on one or more Enterprise Systems Architecture (ESA)/390 systems offered by International Business Machines Corporation, Armonk, N.Y. ES/390 is described in an IBM publication entitled "Enterprise Systems Architecture/390 Principles of Operation," IBM Publication No. SA22-7201-06, July 1999, which is hereby incorporated herein by reference in its entirety. One example of a computing environment based on ES/390 is the 9672 Parallel Enterprise Server offered by International Business Machines Corporation. Further, the computing environment may include, for example, at least one central electronic complex (CEC) having one or more logical partitions (LPARs) and one or more channels.

Figure 1:
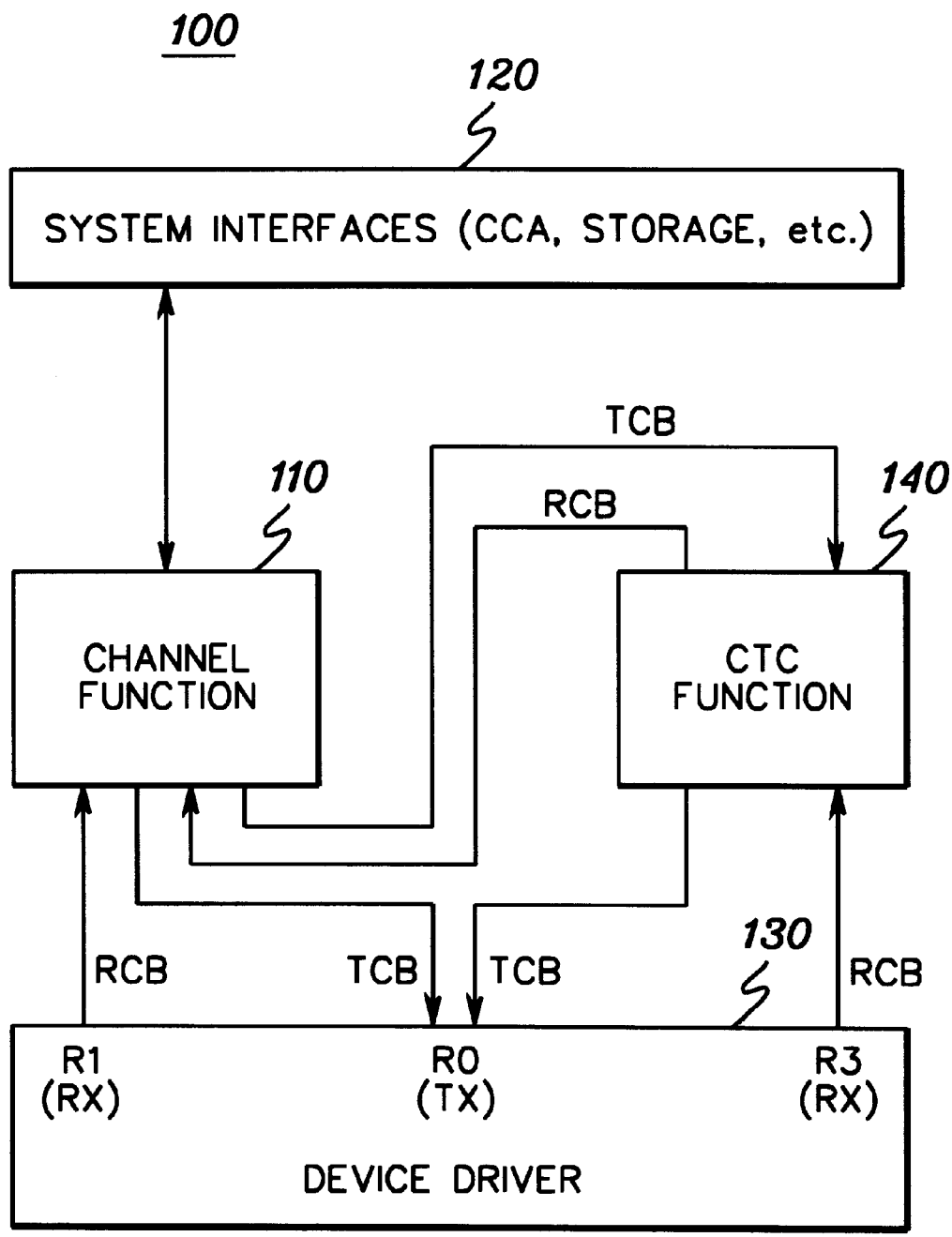
FIG. 1 depicts one embodiment of a channel having a channel function and an integrated channel-to-channel (CTC) function in accordance with the principles of the present invention.

FIG. 1 depicts one embodiment of a channel 100 having an integrated channel-to-channel (CTC) function in accordance with the principles of the present invention. One example of a conventional CTC function is described in the above-referenced IBM publication entitled "Enterprise Systems Architecture/390 ESCON Channel-to-Channel Adapter," Publication No. SA22-7203-00 (1996), the entirety of which is hereby incorporated herein by reference. One example of a channel is a FICON channel offered by International Business Machines Corporation. One example of a FICON channel is described in "IBM S/390 FICON Implementation Guide", IBM Publication No. SG24-5169-00 (November 1999), which is hereby incorporated herein by reference in its entirety.

Channel 100, also referred to herein as a channel path identifier (CHPID), includes a conventional channel function 110 which is shown coupled between system interfaces and a device driver 130 which couples to a fiber channel link (not shown). The architecture of a conventional channel function is described in the above-incorporated IBM publication entitled "Enterprise Systems Architecture/390 Principles of Operation," IBM Publication No. SA22-7201-06, July 1999. IBM's parallel channels, ESCON channels, and FICON channels all abide by the base channel architecture described in this publication. In accordance with the present invention, channel 100 also includes an integrated CTC function 140 which is connected to communicate with channel function 110 and device driver 130. CTC function 140 acts as a dual-sided control unit, providing a control unit function for both the local ("inboard") channel and an external ("outboard") channel on the other side of the fiber channel network. Note that in this embodiment the CTC function does not access storage or any system facilities.

The channel sends and receives information Units (IUs) (also referred to herein as work units) through channel interface by passing Transmit Control Blocks (TCBs) and Receive Control Blocks (RCBs) to and from the Device Driver. For outbound IUs destined for the local CTC, the entire mainline function of the channel prepares and builds TCBs as currently done and is unaware of any differences between CTC and non-CTC traffic. A routing function at the driver interface either sends the outbound IUs to the driver for non-CTC traffic, or passes the IUs to the CTC function based on the logical path configuration (see FIG. 3). For the majority of CTC traffic, the CTC function has only to re-build the Fiber Channel, layer 4, (FC-4) Header, making modifications necessary to give the appearance to the remote channel that the IU originated from a control unit payload portion of the IU. When it is ready to transmit the IU to the outboard channel, the CTC can simply pass the same TCB received from the channel to the driver.

All IUs sent by a FICON channel have a TYPE code in the Fiber Channel, layer 2, (FC-2) header set to 0x1B, and all IUs sent by a FICON control unit have TYPE=0x1C. This provides a convenient means for the driver to route incoming IUs to either the channel function or the CTC function as appropriate. Many Fibre Channel PCI adapter cards provide hardware assists to make routing on the type field fast and efficient. As with outbound IUs, the CTC function will typically only have to rebuild the FC-4 header and then pass the IU to the channel function using the same RCB as was received from the driver. Again, the channel is unaware that the source of the traffic is the local CTC rather than the FICON interface.

Figure 2:
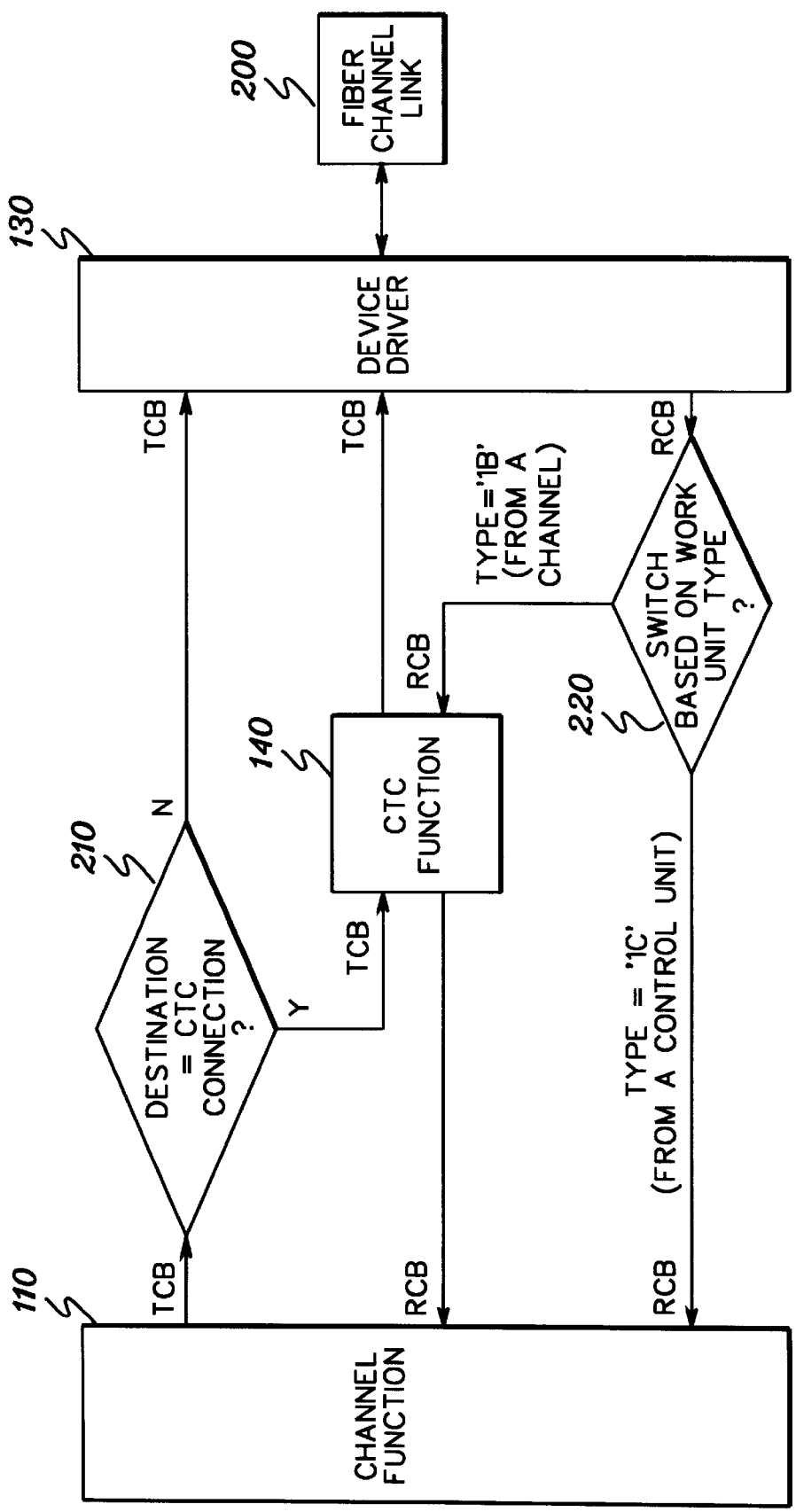
FIG. 2 is a more detailed depiction of the channel of FIG. 1 showing logic for determining whether a work unit is to be forwarded (based on work unit type) to the channel function or the CTC function within the channel in accordance with the principles of the present invention.

FIG. 2 depicts one embodiment of work unit flow within a FICON channel having CTC function capability integrated therewith in accordance with the principles of the present invention. A TCB from channel function 110 is examined by interface logic 210 to determine whether the TCB has a destination configured as the CTC connection. If not, the TCB is simply passed through to device driver 130 for output on fiber channel link 200. If the destination is indicated to be the CTC connection, the TCB is passed to the CTC function 140. CTC function 140 can respond by outputting the TCB to the device driver 130, outputting a different or modified TCB to device driver 130, or outputting a reply RCB back to channel function 110.

As noted above, CTC function 140 comprises a dual-sided communications control unit. RCB received work units passed through device driver 130 are switched 220 based on work unit type. The work unit is passed to the CTC function if the work unit type is '1B', since as noted above, type 1B signals that the unit is from a channel and therefore is directed to the CTC function 140. Conversely, if the unit is of type '1C', the received control block is from a control unit which must be destined for channel function 110. CTC function 140 can respond to the received RCB by passing the RCB itself to channel function 110, passing a modified or different RCB to channel function 110 or transmitting a TCB back in response thereto through device driver 130.

Figure 3:
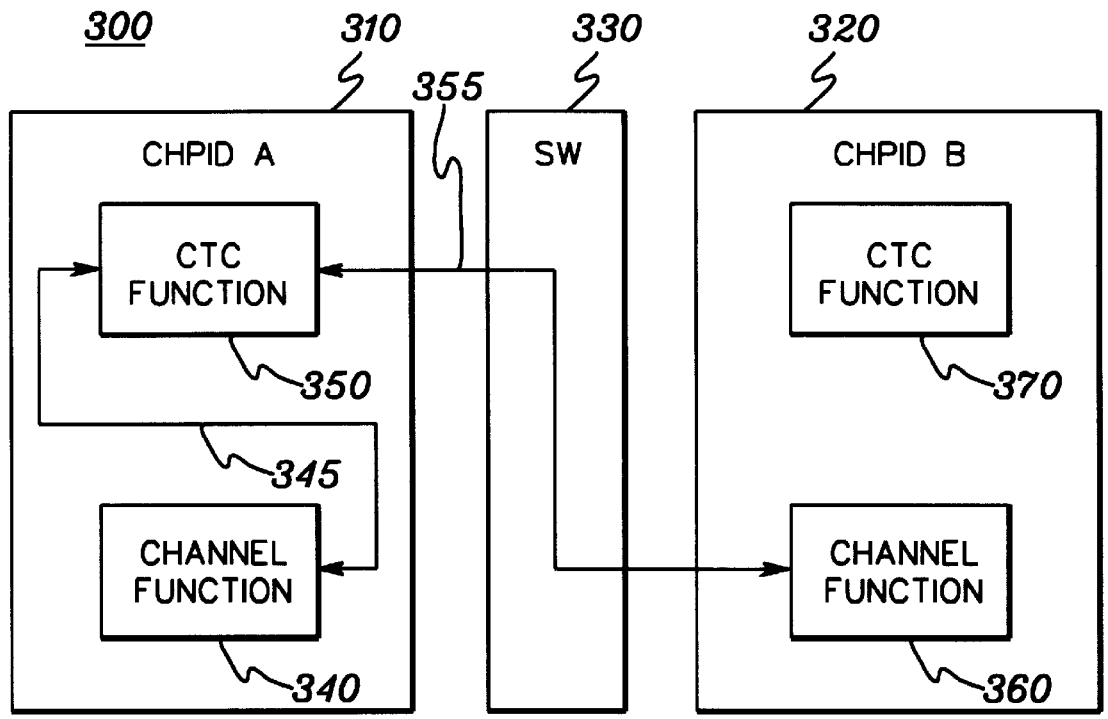
FIG. 3 is a block diagram of one embodiment of a computing environment wherein two channels (e.g., of different computer systems) each contain an integrated CTC function therein in accordance with the principles of the present invention.

FIG. 3 depicts one embodiment of a computing environment, generally denoted 300, wherein a first computer system has a first channel path ID 310 and a second computer system has a second channel path ID 320 which are to form a connection across a switching network 330. Each channel, or Channel Path ID (CHPID), includes an integrated CTC function 350, 370 within the channel along with a conventional channel function 340, 360 as described above. CTC function 350, 370 again comprises a control unit which is to coordinate communication between the channel functions within the different channels.

In FICON architecture, device level communication between a channel and a control unit requires that a "Logical Path" be established between them. In the case of CTC communication, two channels each talk to the two-sided CTC control unit, therefore two logical paths are required for a complete CTC connection. A local logical path is established across an internal link between the channel function and the CTC function on the same CHPID. This path 345 is shown internal to CHPID A in FIG. 3. The remote logical path is established across the Fibre Channel link. This path 355 is shown connecting the two CHPIDs through the switch in FIG. 3.

Given the structure and function of the present invention, an automated means of determining which path will be the local logical path and which will be the remote logical path for any given CTC connection is desired. Otherwise, the customer will have to perform the logical path configuration. Further, since the CTC function represents a load on the microprocessor on the channel card, a means to provide for load balancing, such that the CTC load is spread, e.g., uniformly across all channel paths in the complex, is desirable. Also, the CTC connection method should allow for a CTC capable channel path to properly configure itself when defined to a non-CTC capable channel. Each of the above-noted considerations is accounted for by an automated technique for configuring the logical paths in accordance with the present invention as described below in connection FIG. 5.

Figure 4:
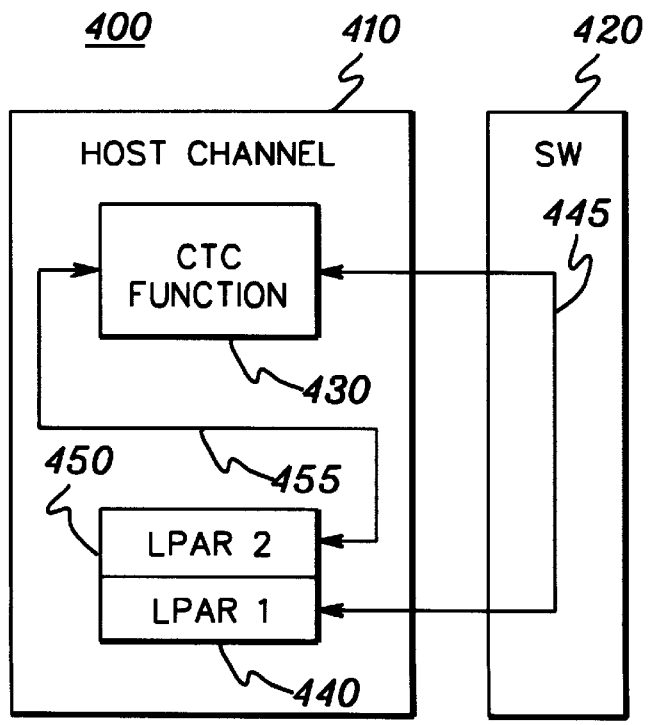
FIG. 4 is a block diagram of one embodiment of partition-to-partition communication employing an integrated CTC function in accordance with the principles of the present invention.

Referring first to FIG. 4, however, a logical path pair is depicted for partition-to-partition communication in accordance with another aspect of the present invention. This computing environment 400 includes a host channel 410 and a network switch 420. The host channel 410 again includes an integrated CTC function 430 and a channel function, different images of which are denoted by LPAR 1 440 and LPAR 2 450. The goal of this aspect of the present invention is to establish LPAR-to-LPAR communication using CTC protocols and a single physical channel path.

The rules for logical path establishment stated herein also provide for partition-to-partition (LPAR-to-LPAR) communication using only a single CHPID. As described further below in connection with FIG. 5, the example configuration of FIG. 4 may have been established as follows: LPAR 2 issues an Establish Logical Path (ELP) which is transmitted over the FICON network and, because the destination N_Port ID is equal to the source N_Port ID, it is "wrapped back" to the sending N_Port and routed to LPAR 1. (N_Port is a Fiber Channel Standard term, which is basically a port within a node of a channel connection. Each port has a transmitter and a receiver. Node, N_Ports and N_Port ID are all terms defined in the Fiber Channel-Physical and Signaling Interface (FC-PH) document published by ANSI.)

The number of local logical paths indicated in the ELP would match the number established on the CHPID. Also, the source and destination N_Port IDs would be equal so the LPAR IDs are compared. LPAR 1 has the lower id so it sends a Link Reject, with reason code of Protocol Error response. This again is "wrapped" to the same N_Port and received by LPAR 2. On receiving the Link Reject, LPAR 2 establishes the local logical path 455. When LPAR 1 issues its ELP, this is routed across the network to LPAR 2. LPAR 2 finds the local path with LPAR 1 already established so it returns a Logical Path Established (LPE) response to LPAR 1, thereby establishing the remote logical path 445.

Note that for partition communication, the local CTC function will always be used by definition, so load balancing is not an issue. If, in the above example, conditions had changed such that there were fewer local logical paths established when LPAR 1 actually processed the ELP than there had been when LPAR 2 had sent it, LPAR 1 would have returned an LPE to the ELP, thereby establishing the remote logical path. Then when an ELP was generated from LPAR 1, it would have established the local logical path. The important point is no matter what set of conditions exist when the ELPs are generated, the rules ensure that the two required paths will be established.

The logical paths determine the routing for device level IUs. All device level traffic on the local logical path is routed across the internal link and all traffic on the remote logical path is routed to the FICON device driver for transmission on the Fibre Channel network. An example of several device level data transfers is given in FIG. 6.

Figure 5:
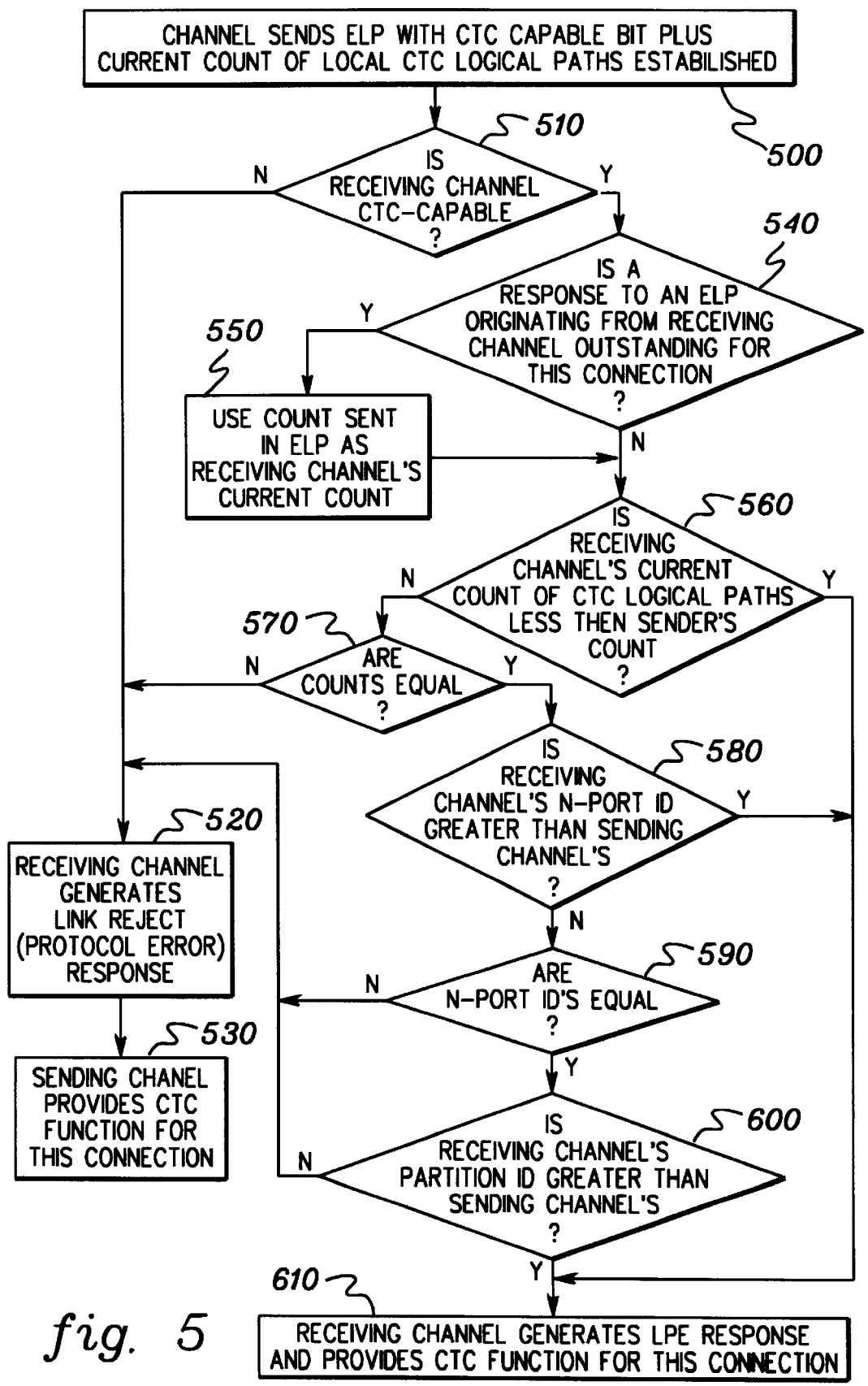
FIG. 5 is a flowchart of one embodiment for auto-configuring a channel-to-channel connection-in accordance with the principles of the present invention.

Referring next to FIG. 5, during initialization, no assumptions are made about which of two channels on two different systems will provide the CTC function for the CTC connection. One channel sends Establish Logical Path (ELP) IUs to all logical control units defined in its configuration regardless of whether they are CTC control units or other types 500. However, for control units defined in the configuration as CTC, the ELP IU contains (in one embodiment) a bit indicating that the sender is CTC capable, and a count field which represents the total number of local CTC logical paths currently establish on that channel path. For CTC connections, these ELPs will be received by the target channel paths. At the receiving channel, inquiry is made whether the receiving channel is CTC-capable 510.

If the channel receiving an ELP is not capable of providing CTC function, it returns a Link Reject, with reason code of Protocol Error response to any ELP 520. When the CTC capable channel which sent the ELP receives the Link Reject response, it recognizes that it must provide the CTC function, so it establishes the local logical path and waits for the non-CTC capable channel to send an ELP to establish the remote logical path 530.

Alternatively, the non-CTC capable channel could send its ELP first. In this case, the receiving channel inspects the CTC capable bit in the received ELP, finds it off, and sends a Logical Path Established (LPE) response to establish the remote logical path. When the ELP is issued by the local system, the remote logical path is found to be established, so the sending of the ELP to the remote system is suppressed and the local logical path is established internally. The "ships passing" case where both sides send their ELPs simultaneously can be handled by requiring that each side take the above prescribed actions independently of the other.

Assuming that the receiving channel is CTC capable, then the receiving channel determines whether a response to an ELP originating from the receiving channel is outstanding for this CTC connection 540. If so, then the count sent in the ELP is used as the receiving channel's current count 550. The receiving channel continues the auto-negotiate aspect of this invention by determining whether the number of local logical paths established at the receiving channel is less than that indicated by the sending channel 560. If so, then the receiving channel provides the CTC function 610. The receiving channel sends an LPE response to establish the remote logical path. When the local system generates an ELP, the remote logical path is found to be established so the sending of the ELP to the remote system is suppressed and the local logical path is established.

If the number of local logical paths is greater than the count received in the ELP, the sending ELP provides the CTC function so a Link Reject response is generated 520. On receiving the Link Reject response, the local logical path is established at the sending channel and it waits for an ELP from the remote channel. When the ELP is later received from the remote channel, the local logical path is already established so the first channel ignores the logical path count field in the ELP and returns an LPE which establishes the remote path.

If an ELP is received and the local logical path count received in the ELP is equal to the number of local logical paths established at the receiver 570, then the N_Port ID of the system which sent the ELP is compared with the N_Port ID of the local system 580. If they are unequal, then the system with the numerically greater N_Port ID provides the CTC function so it behaves as if it had fewer logical paths as prescribed above. If the N_Port IDs of the two systems are also equal 590, as will happen in the partition-to-partition communication case (described above), then the partition IDs are compared 600 and the partition with the numerically greater ID provides the CTC function 520, 610.

It is also possible that two CTC capable channels will transmit ELPs to each other simultaneously. The only additional rule required to handle this case is that each channel preserve the value of the number of local logical paths established sent in each ELP until it receives a response to that ELP. If, while waiting for a response to an ELP, a CTC capable channel receives an ELP from the same N_Port and partition ID to which it sent the ELP, it performs a number of logical paths comparison on the value sent in the ELP, not the number currently established in the channel, which could have changed since the transmission of the original ELP.

Figure 6:
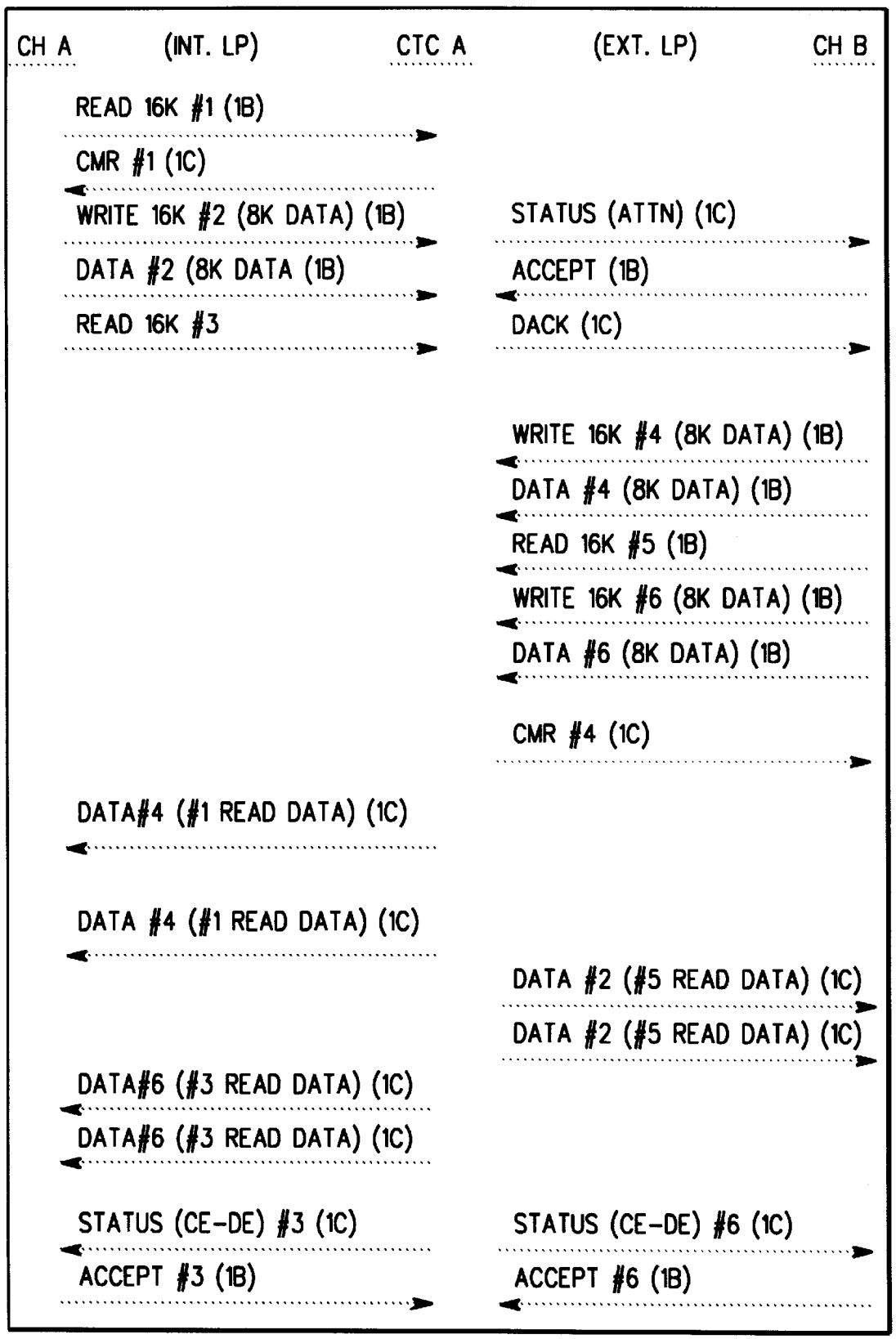
FIG. 6 is an example of device level communications between a channel A on a first system and a channel B on a second system using the CTC function of channel A in accordance with the principles of the present invention.

FIG. 6 shows the sequence flow for a CTC channel program consisting of 3 channel command words (CCWs): a Read-Write-Read chain on CH A and a matching Write-Read-Write chain on CH B. (Note that this chain has been chosen simply to illustrate concepts.) In this example, CH A initiates the operation and streams out the 4 sequences required for the chain. Since CH A is the local logical path, these sequences are all sent to and queued by the CTC element on CH A. Since the CH B logical path is available, command response is returned to CH A and Attention status is generated by CTC A and sent on the FICON link to CH B. CH B accepts the status and CH A ACKs the accept. The Attention status causes the program behind CH B to generate the matching channel program, CH B streams the corresponding sequences to CH A on the FICON link. Since these are sent as TYPE 1B, the hardware/driver routes the RCBs to the CTC function which queues them on its outboard side.

When the first command IU is received, CTC A now has matching commands on both sides so it generates command response to CH B using the proper control unit TYPE of IC. The data provided for CCW #4 on the outboard side is the data for Read CCW #1 on the inboard side, so the CTC rebuilds the FC-4 headers on the IUs and passes them to the inboard channel. Since the counts are satisfied, the CTC may now chain to the next command pair. Here the write data for CCW #2 satisfies the matching read for CCW #5 so CTC A rebuilds the headers and forwards the TCBs to the driver for transmission to CH B. Chaining occurs after all the data has been sent and the process repeats for the third CCW pair (#3<–#6).

When all the data for the third CCW pair has been transmitted, the chain is complete so the CTC A generates CE-DE status and builds and sends Status IUs to both sides. When both sides acknowledge the status the operation is complete.

The present invention can be included, for example, in an article of manufacture (e.g., one or more computer program products) having, for instance, computer usable media. This media has embodied therein, for instance, computer readable program code means for providing and facilitating the capabilities of the present invention. The articles of manufacture can be included as part of the computer system or sold separately.

Additionally, at least one program storage device readable by machine, tangibly embodying at least one program of instructions executable by the machine, to perform the capabilities of the present invention, can be provided.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered to comprise part of the present invention as recited in the appended claims.

While the invention has been described in detail herein in accordance with certain preferred embodiments thereof, many modifications and changes therein may be effected by skilled in the art. Accordingly, it is intended by the appended claims to cover all such modifications and changes as fall within the true spirit and scope of the invention.

What is claimed is:

1. A method for providing communication between channels of at least one computing environment, said method comprising:

providing a channel-to-channel (CTC) function integrated within at least one of a first channel and a second channel between which a CTC connection is to be established; and automatically and dynamically deciding which of said first channel and said second channel is to provide said CTC function for said CTC connection, wherein the automatically and dynamically deciding includes determining a current CTC function loading on at least one of the first channel and the second channel.

2. The method of claim 1, wherein said providing comprises providing a CTC function integrated with each of the first channel and the second channel, and said automatically deciding comprises selecting said first channel or said second channel to provide said CTC function based on CTC function loading at said first channel and said second channel.

3. The method of claim 2, wherein said selecting comprises selecting said first channel or said second channel to provide said CTC function to attempt balancing of CTC function loading at the first channel and the second channel.

4. The method of claim 1, wherein said first channel and said second channel comprise a first FICON channel path id (CHPID) and a second FICON CHPID, respectively.

5. The method of claim 4, wherein said first channel comprises a first channel function and said second channel comprises a second channel function, said CTC function being provided by said first channel, and wherein said automatically deciding comprises automatically determining a local logical path between said first channel function and said CTC function, and automatically determining a remote logical path between said CTC function and said second channel function, thereby establishing said CTC connection.

6. The method of claim 4, wherein said automatically and dynamically deciding comprises comparing counts of CTC logical paths at the first FICON CHPID and the second FICON CHPID and selecting based on which of said first FICON CHPID and said second FICON CHPID has fewer CTC logical paths established.

7. The method of claim 1, wherein the at least one computing environment comprises a first computing environment and a second, heterogenous computing environment, and wherein said first channel resides in said first computing environment and said second channel resides in said second computing environment.

8. The method of claim 1, wherein said CTC function is integrated with only one of said first channel and said second channel, and wherein said automatically deciding comprises automatically determining which of said first channel and said second channel has said CTC function for providing communication therebetween.

9. A system for providing communication between channels of at least one computing environment, said system comprising:

means for providing a channel-to-channel (CTC) function integrated within at least one of a first channel and a second channel between which a CTC connection is to be established; and means for automatically and dynamically deciding which of said first channel and second channel is to provide said CTC function for said CTC connection, wherein the means for automatically and dynamically deciding includes means for determining a current CTC function loading on at least one of the first channel and the second channel.

10. The system of claim 9, wherein said means for providing comprises means for providing a CTC function integrated with each of the first channel and the second channel, and said means for automatically deciding comprises means for selecting said first channel or said second channel to provide said CTC function based on CTC function loading at said first channel and said second channel.

11. The system of claim 10, wherein said means for selecting comprises means for selecting said first channel or said second channel to provide said CTC function to attempt balancing of CTC function loading at the first channel and the second channel.

12. The system of claim 9, wherein said first channel and said second channel comprise a first FICON channel path id (CHPID) and a second FICON CHPID, respectively.

13. The system of claim 12, wherein said first channel comprises a first channel function and said second channel comprises a second channel function, said CTC function being provided by said first channel, and wherein said means for automatically deciding comprises means for automatically determining a local logical path between said first channel function and said CTC function, and means for automatically determining a remote logical path between said CTC function and said second channel function, thereby establishing said CTC connection.

14. The system of claim 12, wherein said means for automatically and dynamically deciding comprises means for comparing counts of CTC logical paths at the first FICON CHPID and the second FICON CHPID and for selecting based on which of said first FICON CHPID and said second FICON CHPID has fewer CTC logical paths established.

15. The system of claim 9, wherein the at least one computing environment comprises a first computing environment and a second, heterogenous computing environment, and wherein said first channel resides in said first computing environment and said second channel resides in said second computing environment.

16. The system of claim 9, wherein said CTC function is integrated with only one of said first channel and said second channel, and wherein said means for automatically deciding comprises means for automatically determining which of said first channel and said second channel has said CTC function for providing communication therebetween.

17. A system for communicating between channels of at least one computing environment, said system comprising:

a first channel and a second channel between which a channel-to-channel (CTC) connection is to be established;

wherein at least one of said first channel and said second channel comprises CTC function logic integrated therein for providing said CTC connection; and wherein said first channel and said second channel are further adapted to automatically and dynamically decide which of the first channel and the second channel is to provide the CTC function for the CTC connection, wherein the automatically and dynamically deciding includes determining a current CTC function loading on at least one of the first channel and the second channel.

18. The system of claim 17, wherein the CTC function logic comprises a dual-sided control unit coupled to a channel function and to a device driver of said at least one first channel and second channel.

19. The system of claim 18, wherein said first channel and said second channel each comprises a FICON channel, and wherein said first channel and said second channel are located in different computing systems.

20. At least one program storage device readable by a machine tangibly embodying at least one program of instructions executable by the machine to perform a method of communicating between channels of at least one computing environment, comprising:

providing a channel-to-channel (CTC) function integrated within at least one of a first channel and a second channel between which a CTC connection is to be established; and automatically and dynamically deciding which of said first channel and said second channel is to provide said CTC function for said CTC connection, wherein the automatically and dynamically deciding includes determining a current CTC function loading on at least one of the first channel and the second channel.

21. The at least one program storage device of claim 20, wherein said providing comprises providing a CTC function integrated with each of the first channel and the second channel, and said automatically deciding comprises selecting said first channel or said second channel to provide said CTC function based on CTC function loading at said first channel and said second channel.

22. The at least one program storage device of claim 21, wherein said selecting comprises selecting said first channel or said second channel to provide said CTC function to attempt balancing of CTC function loading at the first channel and the second channel.

23. The at least one program storage device of claim 20, wherein said first channel and said second channel comprise a first FICON channel path id (CHPID) and a second FICON CHPID, respectively.

24. The at least one program storage device of claim 23, wherein said first channel comprises a first channel function and said second channel comprises a second channel function, said CTC function being provided by said first channel, and wherein said automatically deciding comprises automatically determining a local logical path between said first channel function and said CTC function, and automatically determining a remote logical path between said CTC function and said second channel function, thereby establishing said CTC connection.

25. The at least one program storage device of claim 23, wherein said automatically and dynamically deciding comprises comparing counts of CTC logical paths at the first FICON CHPID and the second FICON CHPID and selecting based on which of said first FICON CHPID and said second FICON CHPID has fewer CTC logical paths established.

26. The at least one program storage device of claim 20, wherein the at least one computing environment comprises a first computing environment and a second, heterogenous computing environment, and wherein said first channel resides in said first computing environment and said second channel resides in said second computing environment.

27. The at least one program storage device of claim 20, wherein said CTC function is integrated with only one of said first channel and said second channel, and wherein said automatically deciding comprises automatically determining which of said first channel and said second channel has said CTC function for providing communication therebetween.

\* \* \* \* \*